United States Patent
Edwards et al.

[11] Patent Number: 6,108,552
[45] Date of Patent: Aug. 22, 2000

[54] METHOD OF ALLOCATING RADIO CHANNELS

[75] Inventors: Keith Russell Edwards, Paignton; Alister Graham Burr, York; Timothy Conrad Tozer, Elvington; David Andrew James Pearce, York, all of United Kingdom

[73] Assignee: Nortel Networks Corporation, Montreal, Canada

[21] Appl. No.: 08/950,622

[22] Filed: Oct. 14, 1997

Related U.S. Application Data

[63] Continuation-in-part of application No. 08/789,045, Jan. 28, 1997.

[30] Foreign Application Priority Data

Oct. 12, 1996 [GB] United Kingdom ................... 9621333

[51] Int. Cl.⁷ ............................. H04Q 7/20; H04B 7/212
[52] U.S. Cl. .................... 455/452; 455/450; 370/348; 370/468; 370/329
[58] Field of Search ...................... 455/436, 525, 455/524, 453, 450, 437, 63, 452, 509, 511; 370/335, 281, 329, 321, 322, 330, 336, 337, 347, 348, 528, 433, 468, 465

[56] References Cited

U.S. PATENT DOCUMENTS

| | | |
|---|---|---|
| 4,144,496 | 3/1979 | Cunningham et al. ................. 455/447 |
| 4,670,899 | 6/1987 | Brody et al. ............................. 455/453 |
| 4,914,650 | 4/1990 | Sriram ...................................... 370/235 |
| 5,463,620 | 10/1995 | Sriram ...................................... 370/412 |
| 5,530,917 | 6/1996 | Andersson et al. ...................... 455/436 |
| 5,563,883 | 10/1996 | Cheng ...................................... 370/449 |
| 5,581,548 | 12/1996 | Ugland et al. ........................... 370/330 |
| 5,805,633 | 9/1998 | Uddenfeldt ............................... 375/202 |
| 5,956,642 | 9/1999 | Larsson et al. .......................... 455/449 |

*Primary Examiner*—Reinhard J. Eisenzopf
*Assistant Examiner*—Charles N. Appiah
*Attorney, Agent, or Firm*—Lee, Mann, Smith, McWilliams, Sweeney & Ohlson

[57] ABSTRACT

This invention relates to radio communications and in particular relates to a method for allocating channels in a radio communications system having a plurality of bearers in a system which is subject to slow temporal fading. In radio communications, signals are transmitted at a particular frequency, in a frequency band or in a number of frequency bands. Obstacles in a signal path, such as buildings in built-up areas and hills in rural areas, act as signal scatterers and these, together with fading, amongst other factors can cause signalling problems whereby signals may not be communicated on certain channel The present invention provides a system and method for channel allocation method for a multi-bearer communications network, with each bearer supporting a number of channels, wherein after allocation of a channel responsive to an access request from the available bearers which can provide access, the maximum number of available slots are left on each bearer, for a particular level of subscription.

10 Claims, 3 Drawing Sheets

OS2 •

OSd •

OS1 •

OS1 •   OS1 •

OS1 •

OS1 •

OS1 •

OS2 •

OS2 •

OS2 •

Bearer 1

→ Frequency

Band 1

Bearer 2

→ Frequency

Band 7

METHOD OF ALLOCATING RADIO CHANNELS

This application is a continuation-in-part of patent application Ser. No. 08/789,045 filed Jan. 28, 1997.

FIELD OF THE INVENTION

This invention relates to radio communications and in particular relates to a method for allocating channels in a radio communications system having a plurality of bearers in a system which is subject to slow temporal fading.

BACKGROUND TO THE INVENTION

In radio communications, signals are transmitted at a particular frequency, in a frequency band or in a number of frequency bands. The signals may be modulated in a variety of fashions using techniques such as Time Division Multiple Access (TDMA), Frequency Division Multiple Access (FDMA), and a multitude of other techniques. Nevertheless there are a finite number of available individual communications channels for separate sets of parties to communicate with each other. For example in TDMA 10 there are ten time slots for data to be encoded as separate channels on a bearer of a frequency band. In many radio communications systems such as GSM digital mobile radio protocol, the communications channel hops from one frequency band to another according to a specified routine. The system overcomes the effects of fading, scattering and other transmission problems on a particular channel by swapping channels and providing an average of the signal strength of the channels available, which will provide a sufficient signal Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions. A receiver moving through this spatially varying field experiences a fading rate which is proportional to its speed and the frequency of the transmission. Since the various components arrive from different directions, there is also a Doppler spread in the received spectrum. If the channel allocation was static, then as the subscriber, for example, moved to an urban environment where signal reflections affected the particular frequency in which the channel was operating more than other frequencies, then the channel which was previously best then becomes poor. In fact such movement may produce a break in communications. In fixed radio applications, the problems of fading still exist but are not so rapid; in a fixed system, the best channel would be likely to stay the best signal for a period of time.

In a cellular radio communication network, assuming uniform random distribution, there will be a tendency for the number of out stations to increase towards the edge of the range: three quarters of the area of a cell is occupied by the area defined by a sweep of the second half of the radius from the centre of an arc drawn from the centre of a base station. Problems occur, for example, due to increases in demand from regions on the edge of a cell where the vagaries of increased distance of an out station relative to a base station become more apparent. As the distance of an out station from a base station increases, then the contention for available channels increases.

One situation that frequently arises is that one will tend to get subscribers close to the base station being able to see all the frequency bearers being transmitted by the base station equally well—there may be some fading on some frequency bearers, but when in close proximity to the base station, a loss of 10 or 20 dB is of little or no consequence: the channel is a good channel. The further out that an outstation lies to the base station, then there will be an increase in the chance and severity of fading which can make some channels unusable whilst the other channels remain satisfactory or do indeed remain perfectly good. The situation will exist that a number of bearers, each of which contain a number of communication channels—and they need not be TDMA slots nor even slotted; just another physical resource that can be used—that the number of users on a particular bearer may be exhausted before full capacity is reached for the system. For example there may be a large number of subscribers in a particular area and the best signal channel is allocated even though the subscribers are in close proximity to the base station. Any further subscribers who wish to communicate on the bearer which has been swamped by the large number of subscribers in close proximity to the base station will be denied access to that particular channel. As systems in crease in their subscriptions, then these problems will become more frequently apparent.

OBJECT OF THE INVENTION

The present invention seeks to provide an improved form of channel allocation with a radio communications system which is subject to slow temporal fades.

SUMMARY OF THE INVENTION

In accordance one aspect of the present invention, there is provided a channel allocation method for a multi-bearer communications network, with each bearer supporting a number of channels, wherein after allocation of a channel responsive to an access request from the available bearers which can provide access, the maximum number of available slots are left on each bearer, for a particular level of subscription.

Preferably the channels are weighted. The weights can be determined by a variety of determinants, such as the number of vacant channels on a particular bearer, signal quality, signal strength, distance of out station to base station, and signal history of a bearer. Preferably, the channels are maximally weighted in the case that only one bearer can provide a channel.

Preferably, the channel allocation is re-assessed on a regular basis, for instance every time an out station terminates a communication.

Thus the channels are allocated whereby bearers are evenly depleted so that in the event of a request for a channel being received in an area where only one bearer can be used under the conditions that exist for a particular period of time, there is a high probability that this request can be satisfied without the increased overheads of transferring a channel user on the particular channel to be transferred to a different channel on a different bearer. System capacity is improved since the probability of the number of available channels in any particular bearer are reduced.

In accordance with another aspect of the present invention, there is provided a radio telecommunications system including one or more base stations and a number of out stations which operate under conditions of slow temporal fading, wherein for communications there are at least two bearers, each bearer supporting at least two channels, wherein the base station comprises means to allocate communication channels on an adaptive least number fill process.

BRIEF DESCRIPTION OF THE DRAWINGS

Embodiments of the invention will now be described with reference to the accompanying drawings, wherein.

DETAILED DESCRIPTION OF PREFERRED EMBODIMENTS

Referring now to Figure one, there is shown a basic radio communications network wherein there are several out stations OS1 which communicate with a first base station BS; other out stations OS2 communicate with further base stations BS2, depending upon their position. The figure shows a typical scenario where there is an uneven distribution in the number of out stations communicating with a base station. There are many out stations in close proximity to the base station and there are a smaller number of out stations on the peripheral edge of the zone. Out station OSd wishes to make a communication using the radio system. Because of his distance to the base station, several bearers may not be operable, OSd may only make a call if there are available channels on an available bearer.

Figure 1:
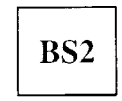
FIG. 1 depicts a basic radio network in accordance with the invention.
Figure 1:
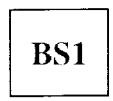
Figure 1:
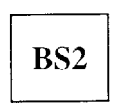
Figure 1:
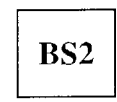
Figure 2:
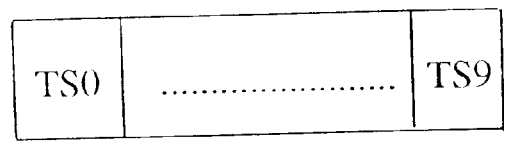
FIG. 2 shows a simple two bearer multiple access scheme.
Figure 2:
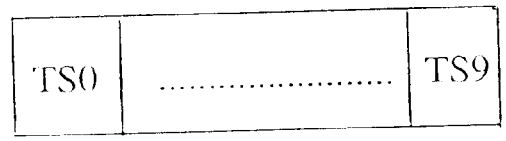
Figure 3:
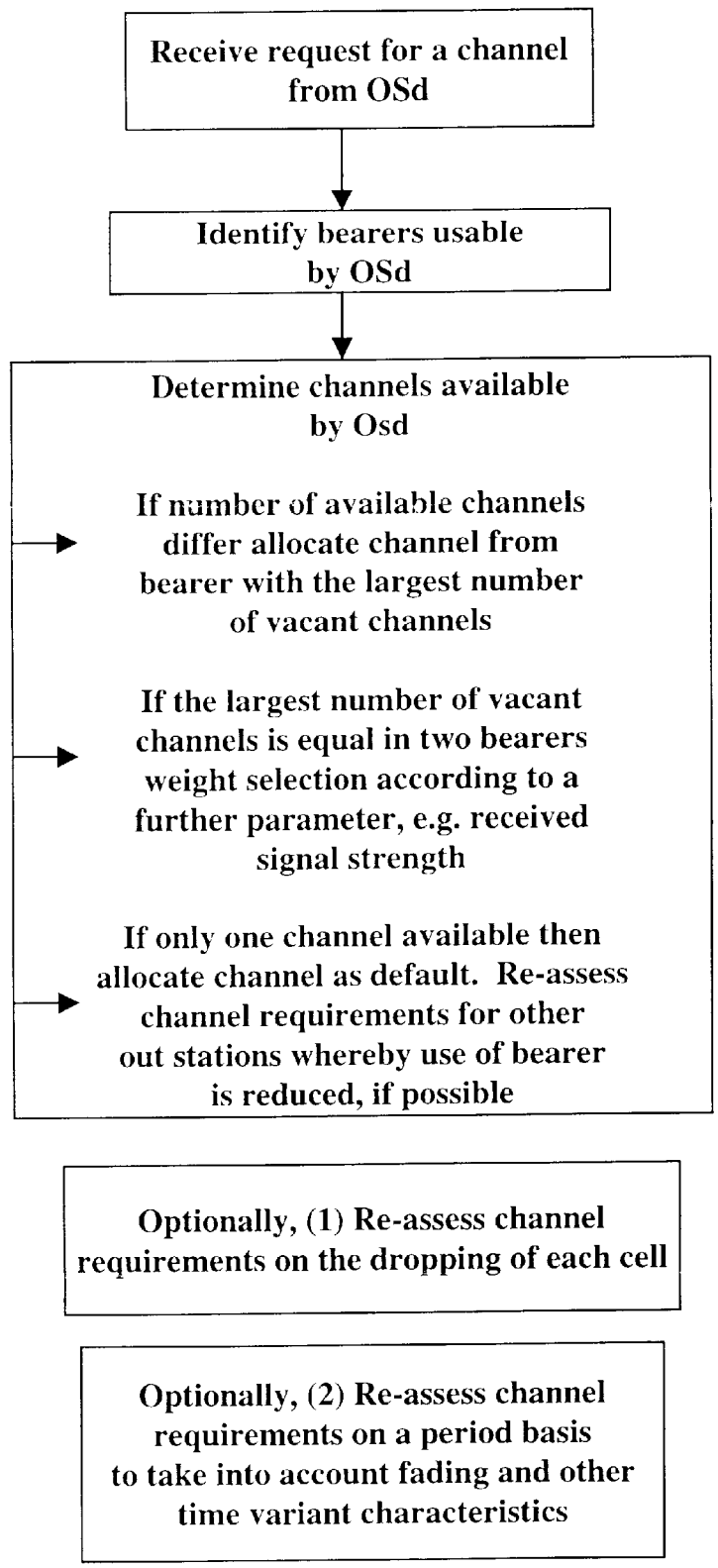
FIG. 3 is a flow chart of a channel allocation scheme in accordance with the invention.

Assuming that the system is subject to slow fading such as a Rayleigh fading i.e. the signals are not subject to rapid fading as typically occurs in mobile wireless systems such as GSM. That is to say that once a communications channel selected as a link between a base station and an out station will remain operable for an extended period of time, and there will be no need to make a number of channel changes in order to remain in communication. Referring to FIG. 2 there are two frequency bands available to provide two bearers, bearer 1, B1, and bearer 2, B2, and each bearer has 10 time slots—B1, 0–9 and B2, 0–9. The out stations close to the base sight see both carriers acceptably well. Certain out stations towards the edge of range, however, may prefer B1, because they are in a frequency selective fade on B2 but not on B1; others might be the subject of contrary conditions and may only see B2 reasonably well but not B1. When out stations request a channel, instead of assigning the best available signal, the available bearers are reviewed; if the out station can see both bearers, then the channel is assigned to the bearer which has the least number of channels presently allocated to other out stations; if the out station can only see one bearer, then there is effectively no choice. Obviously, in most systems, there are more than two available bearers. FIG. 3 is a flow chart depicting the various stages upon the receipt of a request for a communications channel.

Consider a first situation, where there are five out stations currently operating on bearer one and there are eight people operating on bearer two, then if there was a channel request from a further out station, then it would be preferable that the further out station should be placed on bearer one if it was acceptable, and only in the event if it was not acceptable would use the ninth available resource. Similarly, should the situation develop further, and a still further out station requests a channel and bearer two proves to be the only bearer capable of providing a channel, then the tenth channel will be allocated.

Ideally, the above situation does not occur frequently; if a tenth channel was allocated on any particular bearer, then access would be denied to any further request to have such a bearer provided. In a preferred embodiment, the channel allocated would be re-assessed whenever the situation arose that there was an uneven distribution of users operating on the bearers—typically on, each assignation of a channel to a request; it need not be necessary to reassign a channel upon the dropping of a channel at the termination of a call. For instance, consider the situation when nine channels have been allocated to each bearer to out stations which could equally see both bearers, five users on bearer one drop their connections and a further out station requests a channel but can only see bearer two. If the situation is not dynamic, then bearer two would be full and would no longer be capable of providing further communication channels. A subsequent request by another out station which can only see bearer two would be denied access unless the currently available channels are re-allocated. Thus a maintenance allocation system is preferably provided whereby periodically the links are re-assessed in the event that one bearer is supporting more users than the other. The re-assessment may be on a time-period, upon the vacancy of a channel or upon the receipt of a new channel request.

Take for example another situation where there are 4 channels taken on bearer one and six channels taken on bearer two. Suppose that an out station makes a channel allocation request. The base station assesses the frequencies possible and finds that the frequency allotted to bearer two provides a better link than that offered by bearer one. Conventional wisdom would allocate bearer two to the new out station since it provides a better response. Nevertheless a usable link may be sustained on bearer one and because there are more channels in use on bearer two, the base station will allocate bearer one for the new out station.

In a similar situation, where there are two channels taken on bearer one and there are nine channels taken on bearer two, it may be possible to transfer a call from bearer two and allocate two channels on bearer one for a single to compensate for a poor channel rather than have ten channels occupied on bearer two. This may appear counter intuitive because it uses too many time slots but what it means is that both bearer one and bearer two have available resources. This is a further occasion where the method maximises the minimum number of slots available-on each carrier.

It may be the case that by allocating two channels a half the bit rate modulation scheme could be employed and double the number of channels are employed—the method provides a more expedient way of allocating available resources. The available resources could be coding, could be the bit rate, could be the diversity scheme.

Allocation can be performed using a simple weighting algorithm wherein the weighting in favour of adopting a particular channel is proportional to the number of vacant slots available on a particular bearer. The fewer the number of available slots the less the weighting. If the number of slots is equal, then the weighting could be based on the signal strength or another factor such as the history of a channel use. One way of doing it would be to multiply the numbers of slots, because if you ever had no free slots, then a metric of zero would be realised. If a metric was the number of slots left available then if only a single slot was free, such a slot would be deweighted unless mandatory.

If it was a mandatory selection i.e. no choice existed since only one channel was free or that the out station could only see one particular bearer, then a default situation would arise and the weighting factor would be a maximum. Nevertheless, by having the channel allocation re-assessed simultaneously, it may be that one or more users are re-allocated when there are two or more channels free in another bearer.

What is claimed is:

1. A channel allocation method for a multi-bearer communications network, with each bearer supporting a number of channels, wherein after allocation of a channel responsive to an access request from the available bearers which can provide access, whereby the bearers are evenly or equally depleted so that the maximum number of available channels are left on each bearer, for a particular level of subscription.

2. A channel allocation method according to claim 1 wherein channels are weighted.

3. A channel allocation method according to claim 1 wherein channels are weighted according to the number of vacant channels on a particular bearer.

4. A channel allocation method according to claim 1 wherein channels are weighted according to signal quality.

5. A channel allocation method according to claim 1 wherein channels are weighted according to signal quality and wherein signal power is a weighted discriminant.

6. A channel allocation method according to claim 1 wherein channels are weighted according to signal quality and wherein signal history of a bearer is a weighted discriminant.

7. A channel allocation method according to claim 1 wherein channels are weighted and wherein channels are maximally weighted in the case that only one bearer can provide a channel.

8. A channel allocation method according to claim 1 wherein the allocation is re-assessed on a regular basis.

9. A channel allocation method according to claim 1 wherein the allocation is re-assessed upon the completion of a communication.

10. A radio telecommunications system including one or more base stations and a number of out stations wherein the telecommunications system is a multi-bearer network and each bearer can support a number of channels, a method comprising, after allocation of a channel responsive to an access request from the available bearers which can provide access then the channels are allocated whereby the bearers are evenly or equally depleted such that a maximum number of available channels are left on each bearer, for a particular level of subscription.

* * * * *